US011215756B2

United States Patent
Bian et al.

(10) Patent No.: US 11,215,756 B2
(45) Date of Patent: Jan. 4, 2022

(54) EDGE COUPLERS WITH STACKED LAYERING

(71) Applicant: GLOBALFOUNDRIES U.S. Inc., Santa Clara, CA (US)

(72) Inventors: Yusheng Bian, Ballston Lake, NY (US); Roderick A. Augur, Saratoga Springs, NY (US); Michal Rakowski, Ballston Spa, NY (US); Kenneth J. Giewont, Hopewell Junction, NY (US); Karen Nummy, Newburgh, NY (US); Kevin K. Dezfulian, Arlington, VA (US); Bo Peng, Wappingers Falls, NY (US)

(73) Assignee: Globalfoundries U.S. Inc., Santa Clara, CA (US)

( * ) Notice: Subject to any disclaimer, the term of this patent is extended or adjusted under 35 U.S.C. 154(b) by 0 days.

(21) Appl. No.: 16/859,347

(22) Filed: Apr. 27, 2020

(65) Prior Publication Data
US 2021/0333474 A1    Oct. 28, 2021

(51) Int. Cl.
*G02B 6/122* (2006.01)
*G02B 6/13* (2006.01)

(52) U.S. Cl.
CPC ............. *G02B 6/1228* (2013.01); *G02B 6/13* (2013.01)

(58) Field of Classification Search
CPC .................................. G02B 6/1228; G02B 6/13
See application file for complete search history.

(56) References Cited

U.S. PATENT DOCUMENTS

| | | | | |
|---|---|---|---|---|
| 5,432,872 A * | 7/1995 | Stewart | ................... | G02B 6/262 385/129 |
| 7,738,753 B2 * | 6/2010 | Assefa | ................... | B82Y 20/00 385/49 |
| 8,744,225 B2 * | 6/2014 | Yoshida | ................. | G02B 6/125 385/43 |
| 9,726,821 B2 * | 8/2017 | Murray | .................... | G02B 6/14 |
| 9,759,864 B2 * | 9/2017 | Painchaud | ........... | G02B 6/1228 |
| 2003/0053756 A1 * | 3/2003 | Lam | ..................... | G02B 6/1228 385/49 |
| 2004/0037497 A1 * | 2/2004 | Lee | ...................... | G02B 6/1228 385/28 |

(Continued)

FOREIGN PATENT DOCUMENTS

WO    2015143987 A2    10/2015

OTHER PUBLICATIONS

The German Patent and Trade Mark Office, Official Action issued in German Patent Application No. 10 2021 101 715.7 dated Mar. 1, 2021.

(Continued)

*Primary Examiner* — Daniel Petkovsek
(74) *Attorney, Agent, or Firm* — Thompson Hine LLP; Anthony Canale (57) ABSTRACT

Structures including an edge coupler and methods of fabricating a structure including an edge coupler. The edge coupler includes a waveguide core, and a shaped layer is positioned over a portion of the waveguide core. The waveguide core is comprised of a first material, and the shaped layer is comprised of a second material different in composition from the first material. The first material may be, for example, single-crystal silicon, and the second material may be, for example, silicon nitride.

7 Claims, 5 Drawing Sheets

(56) References Cited

U.S. PATENT DOCUMENTS

| | | | |
|---|---|---|---|
| 2005/0123244 A1* | 6/2005 | Block | G02B 6/1221 |
| | | | 385/43 |
| 2015/0277036 A1* | 10/2015 | Jiang | G02B 6/12 |
| | | | 385/43 |
| 2017/0090118 A1* | 3/2017 | Sodagar | G02B 6/1228 |
| 2017/0097470 A1 | 4/2017 | Jiang | |
| 2018/0210009 A1 | 7/2018 | Aksyuk et al. | |
| 2021/0109290 A1* | 4/2021 | Kimerling | G02B 6/43 |

OTHER PUBLICATIONS

Hatori et al., "A Hybrid Integrated Light Source on a Silicon Platform Using a Trident Spot-Size Converter" Journal of Lightwave Technology, vol. 32, No. 7, pp. 1329-1336, Apr. 1, 2014.

Cazzanelli et al., "Second-harmonic generation in silicon waveguides strained by silicon nitride" Nature Mater 11, 148-154 (2012).

Jacobsen et al. "Strained silicon as a new electro-optic material" Nature 441, 199-202.

Avrutsky et al., "Phase-matched sum frequency generation in strained silicon waveguides using their second-order nonlinear optical susceptibility" Opt. Express 19, 21707-21716 (2011).

Chmielak et al., "Investigation of local strain distribution and linear electro-optic effect in strained silicon waveguides" Opt. Express 21, 25324-25332 (2013).

Liao et al., "Vertically integrated spot-size converter in AlGaAs-GaAs" Opt. Lett. 42, 4167-4170 (2017).

Roelkens et al., "Laser emission and photodetection in an InP/InGaAsP layer integrated on and coupled to a Silicon-on-Insulator waveguide circuit" Opt. Express 14, 8154 8159 (2006).

Tu et al., High-efficiency Ultra-broadband Multi-tip Edge Couplers for Integration of Distributed Feedback Laser with Silicon-on-insulator Waveguide IEEE Photonics Journal, vol. 11, No. 4, pp. 1-13, Aug. 2019.

Rakowski et al., "45nm CMOS—Silicon Photonics Monolithic Technology (45CLO) for next-generation, low power and high speed optical interconnects" Optical Fiber Communication Conference (OFC) 2020, OSA Technical Digest (Optical Society of America, 2020), paper T3H.3.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019.

* cited by examiner

EDGE COUPLERS WITH STACKED LAYERING

BACKGROUND

The present invention relates to photonics chips and, more specifically, to structures including an edge coupler and methods of fabricating a structure including an edge coupler.

Photonics chips are used in many applications and systems such as data communication systems and data computation systems. A photonics chip integrates optical components, such as waveguides, optical switches, edge couplers, and polarizers, and electronic components, such as field-effect transistors, into a unified platform. Among other factors, layout area, cost, and operational overhead may be reduced by the integration of both types of components.

An edge coupler is commonly used for coupling laser light between a semiconductor laser and optical components on the photonics chip. The edge coupler may include a narrowed section of a waveguide core that is significantly smaller in cross-sectional area than the beam of laser light emitted by the semiconductor laser. Inefficiencies in the coupling between the semiconductor laser and a silicon waveguide core of an edge coupler may occur due to mode size, as well as mode shape. These inefficiencies may lead to significant coupling loss.

Improved structures including an edge coupler and methods of fabricating a structure including an edge coupler are needed.

SUMMARY

In an embodiment of the invention, a structure includes an edge coupler having a waveguide core and a shaped layer positioned over a portion of the waveguide core. The waveguide core is comprised of a first material, and the shaped layer is comprised of a second material different in composition from the first material.

In an embodiment of the invention, a method includes forming an edge coupler having a waveguide core, and forming a shaped layer positioned over a portion of the waveguide core. The waveguide core is comprised of a first material, and the shaped layer is comprised of a second material different in composition from the first material.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
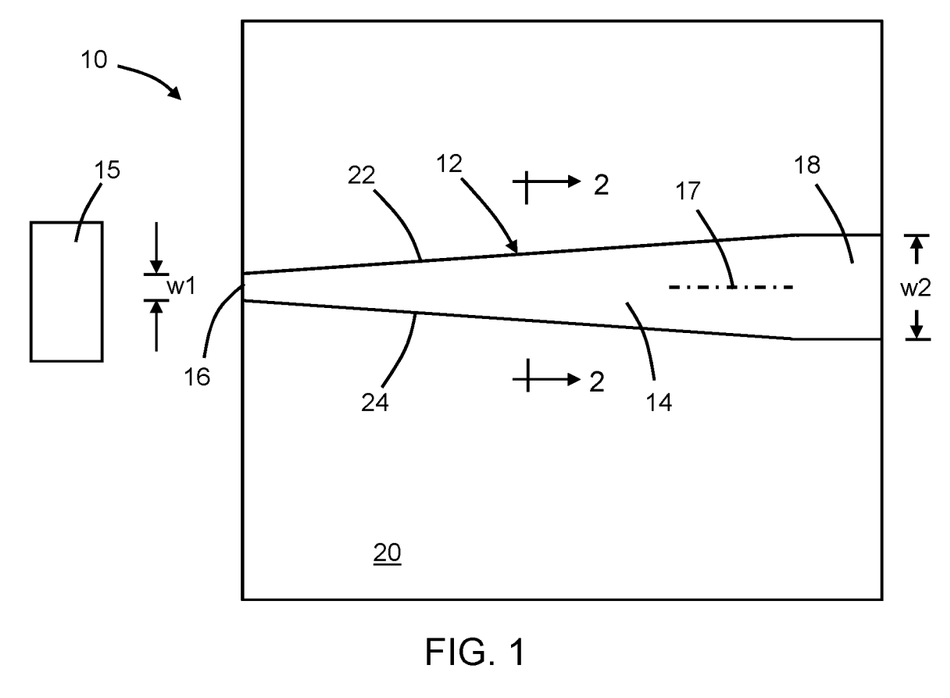
FIG. 1 is a top view of a photonics chip including a structure at an initial fabrication stage of a processing method in accordance with embodiments of the invention.
Figure 2:
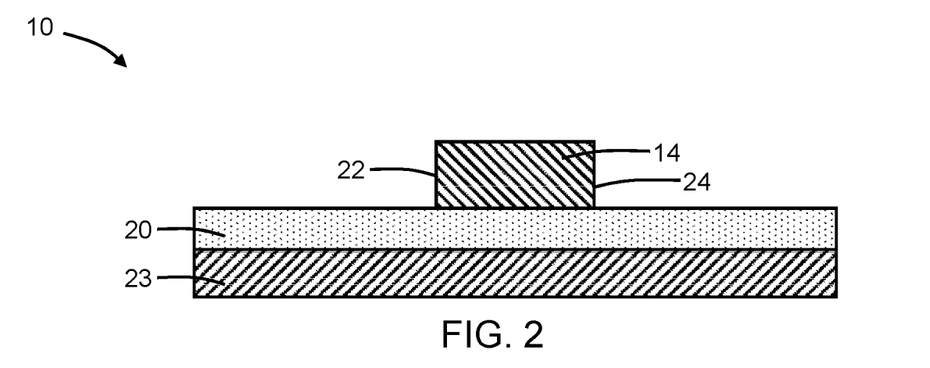
FIG. 2 is a cross-sectional view of the structure taken generally along line 2-2 in FIG. 1.

With reference to FIGS. 1, 2 and in accordance with embodiments of the invention, a structure 10 for an edge coupler includes a waveguide core 12 having an inverse taper 14, an end surface 16 that is positioned adjacent to a laser 15, and a non-tapered section 18 directly connected to the inverse taper 14. In an embodiment, the non-tapered section 18 of the waveguide core 12 may be a straight section. The waveguide core 12, which is arranged over a dielectric layer 20, may be aligned along a longitudinal axis 17. In the representative embodiment, the end surface 16 terminates the inverse taper 14 and provides a surface of given cross-sectional area that is butted with the laser 15 and that participates in receiving laser light emitted from the laser 15.

The waveguide core 12 may be comprised of a single-crystal semiconductor material, such as single-crystal silicon. In an embodiment, the single-crystal semiconductor material may originate from a device layer of a silicon-on-insulator (SOI) wafer that further includes a buried oxide layer providing the dielectric layer 20 and a substrate 23 comprised of a single-crystal semiconductor material, such as single-crystal silicon. The waveguide core 12 may be patterned from a layer of the single-crystal semiconductor material by lithography and etching processes during front-end-of-line processing of the photonics chip.

The laser 15 may be configured to emit laser light of a given wavelength, intensity, mode shape, and mode size that is directed toward the end surface 16 of the waveguide core 12. The space between the laser 15 and the end surface 16 of the waveguide core 12 may be filled by air or, alternatively, by an index-matching material. The laser 15 may be comprised of III-V compound semiconductor materials. The laser 15 may be, for example, an indium phosphide/indium-gallium-arsenic phosphide laser. The laser 15 may be located on the photonics chip including the waveguide core 12 or, alternatively, may be located off-chip.

The inverse taper 14 may extend lengthwise parallel to the longitudinal axis 17 from the end surface 16 to a transition to the non-tapered section 18. The waveguide core 12 includes opposite sidewalls or side surfaces 22, 24 that increase in separation over a length of the inverse taper 14 with increasing distance from the end surface 16. The side surfaces 22, 24 may be vertical or, alternatively, may be angled with an acute angle relative to the top surface of the dielectric layer 20. The increasing width dimension of the waveguide core 12 over the length of the inverse taper 14 may end at the transition to the non-tapered section 18.

The width dimension of the waveguide core 12 may be measured as a perpendicular distance between the side surfaces 22, 24. The waveguide core 12 may have a width, W1, at the end surface 16, and the waveguide core 12 may have a larger width, W2, at the transition to the non-tapered section 18. The inverse taper 14 may provide the transition in width dimension from the smaller width, W1, to the larger width, W2. In the representative embodiment, the inverse taper 14 of the waveguide core 12 has the width, W1, at the end surface 16 and the inverse taper 14 of the waveguide core 12 has the width, W2, at the transition to the non-tapered section 18. The inverse taper 14 may have a linear width variation for its tapered shape based on a linear function or, alternatively, may have a width that varies based on a non-linear function, such as a quadratic, parabolic, or exponential function, over its length. In a representative embodiment, the width, W1, at the end surface 16 may range from 0.01 times the wavelength of the laser light received from the laser 15 to 0.1 times the wavelength of the laser light received from the laser 15. The inverse taper 14 has a length measured as a distance from the end surface 16 to the transition between the inverse taper 14 and the non-tapered section 18.

In an alternative embodiment, the waveguide core 12 may be comprised of silicon nitride instead of single-crystal silicon. In an alternative embodiment, the substrate 23 may include a groove immediately adjacent to the end surface 16.

Figure 3:
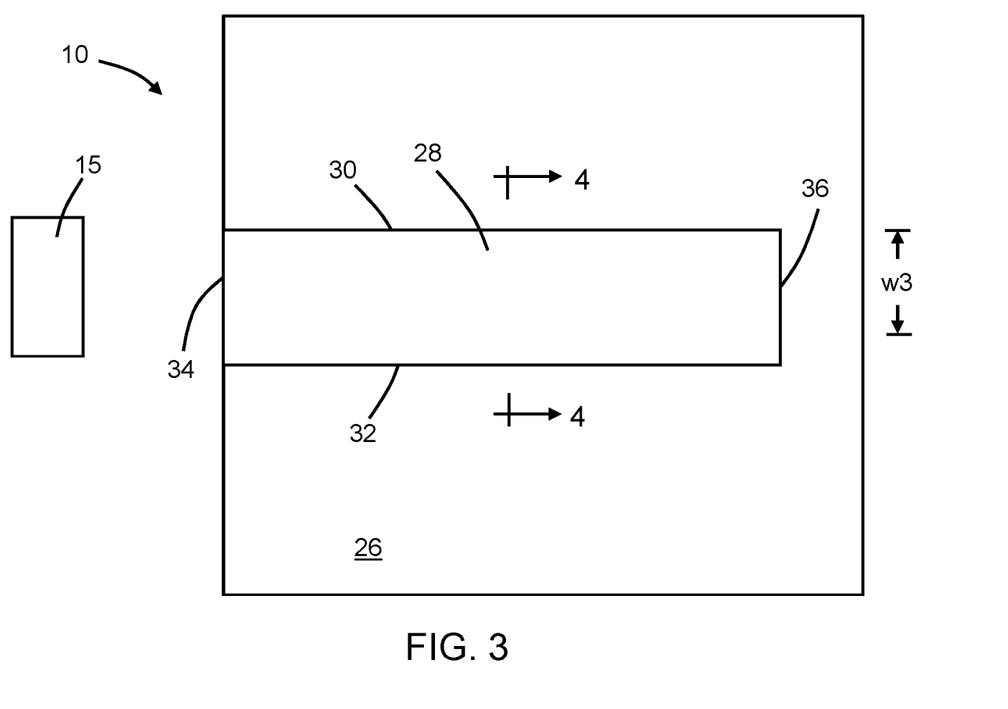
FIG. 3 is a top view of the structure at a fabrication stage subsequent to FIG. 1.
Figure 4:
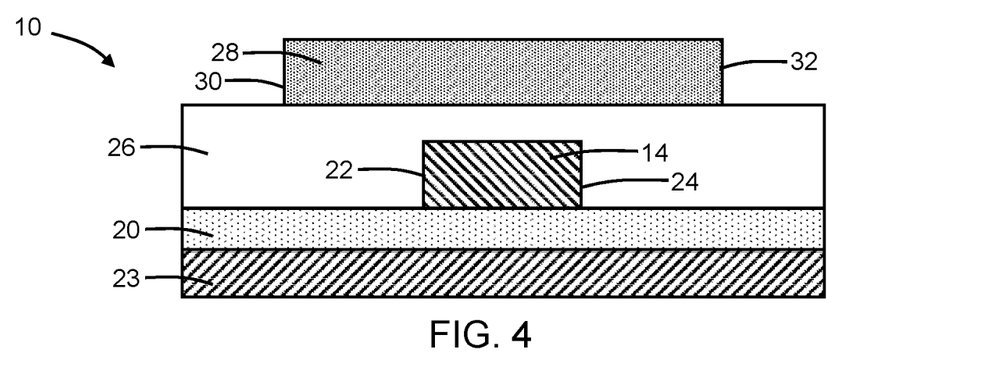
FIG. 4 is a cross-sectional view of the structure taken generally along line 4-4 in FIG. 3.

With reference to FIGS. 3, 4 in which like reference numerals refer to like features in FIGS. 1, 2 and at a subsequent fabrication stage, a dielectric layer 26 is formed over the waveguide core 12. The dielectric layer 26 may be comprised of a dielectric material, such as silicon dioxide, deposited by chemical vapor deposition and planarized with, for example, chemical-mechanical polishing to remove topography. The waveguide core 12 is embedded and buried in the dielectric material of the dielectric layer 26. Additional dielectric layers (not shown) may be formed over the dielectric layer 26 and, for example, may be respectively comprised of silicon nitride and silicon dioxide to define a heterogeneous layer stack.

A shaped layer 28 may be formed on the dielectric layer 26 at a position that is directly over the inverse taper 14 of the waveguide core 12. A portion of the dielectric layer 26 is positioned between the waveguide core 12 and the shaped layer 28. The portion of the dielectric layer 26 prevents direct contact between the waveguide core 12 and the shaped layer 28. The shaped layer 28 is layered in a stack with the inverse taper 14 of the waveguide core 12. The shaped layer 28 is located in a different plane than the waveguide core 12 in order to provide the layered stacking.

The shaped layer 28 may be formed by depositing a layer of a material over the dielectric layer 26 and patterning the deposited layer with lithography and etching processes. To that end, an etch mask is formed by a lithography process over the deposited layer, and unmasked sections of the deposited layer are etched and removed with an etching process, such as reactive ion etching. The shape of the etch mask determines the patterned shape of the shaped layer 28. In the representative embodiment, the shaped layer 28 may have a patterned shape of a block or a slab characterized by an outer perimeter. In the representative embodiment, the patterned shape of the shaped layer 28 may be rectangular with an outer perimeter having corners. The etching process may be selected to stop on the material of the dielectric layer 26 after penetrating fully through the deposited dielectric layer. The shaped layer 28 contains a material having a different composition than the material of the waveguide core 12. In an embodiment, the shaped layer 28 may be comprised of a dielectric material, such as silicon nitride, that is deposited by chemical vapor deposition.

The shaped layer 28 has opposite sidewalls or side surfaces 30, 32 and end surfaces 34, 36 that extend from one side surface 30 to the other side surface 32. The side surfaces 30, 32 and end surfaces 34, 36 of the shaped layer 28 surround the outer perimeter of the shaped layer 28. The end surface 34 may be coplanar or substantially coplanar with (i.e., directly over) the end surface 16 of the waveguide core 12. The end surface 36 may be positioned directly over the transition between the inverse taper 14 and non-tapered section 18 of the underlying waveguide core 12. In the representative embodiment, the shaped layer 28 may be lengthwise positioned over the entirety of the inverse taper 14. In alternative embodiments, the shaped layer 28 may be lengthwise positioned over only a portion of the inverse taper 14. The side surfaces 22, 24 of the inverse taper 14 are arranged between the side surface 30 and the side surface 32 of the shaped layer 28.

The length of the shaped layer 28 may be measured in a direction parallel to the longitudinal axis 17 from the end surface 34 to the end surface 36. The length of the shaped layer 28 may be equal of substantially equal to the length of the inverse taper 14. In alternative embodiments, the length of the shaped layer 28 may be less than the length of the inverse taper 14. The width, W3, of the shaped layer 28 may be measured as a perpendicular distance from the side surface 30 to the side surface 32. The width, W3, of the shaped layer 28 may be greater than the width, W1, of the waveguide core 12 (FIG. 1) and may also be greater than the width, W2, of the waveguide core 12 (FIG. 1). In a representative embodiment, the width, W3, of the shaped layer 28 may be greater than 0.25 times the wavelength of the laser light received from the laser 15.

Figure 5:
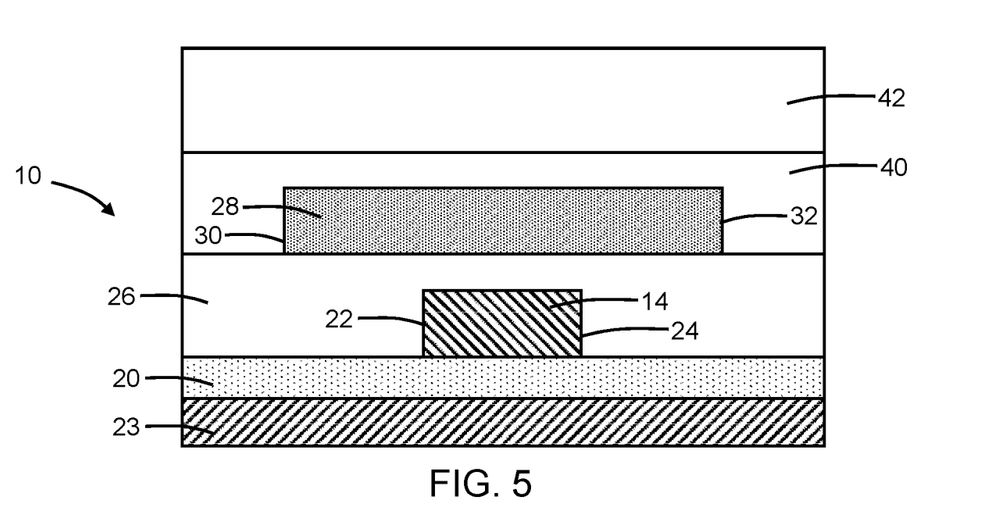
FIG. 5 is a cross-sectional view of the structure at a fabrication stage subsequent to FIG. 4.

With reference to FIG. 5 in which like reference numerals refer to like features in FIG. 4 and at a subsequent fabrication stage, a dielectric layer 40 is formed over the shaped layer 28. The dielectric layer 40 may be comprised of a dielectric material, such as silicon dioxide, deposited by chemical vapor deposition and planarized with, for example, chemical-mechanical polishing to remove topography. The shaped layer 28 is embedded or buried in the dielectric material of the dielectric layer 40.

A back-end-of-line stack 42 is formed over the dielectric layer 40. The back-end-of-line stack 42 includes one or more dielectric layers that may be comprised of dielectric material, such as silicon dioxide, and metallization comprised of, for example, copper or aluminum, that is arranged in the one or more interlayer dielectric layers.

The structure 10, in any of its embodiments described herein, may be integrated into a photonics chip that includes electronic components and additional optical components. For example, the electronic components may include field-effect transistors that are fabricated by CMOS front-end-of-line (FEOL) processing.

The structure 10 provides a monolithically-integrated stacked edge coupler for efficient butt-end light coupling with the laser 15. The structure 10 for the stacked edge coupler is heterogeneous because the materials of the waveguide core 12 and the shaped layer 28 are different in composition. The structure 10 may improve mode matching (i.e., the matching of mode shape and/or mode size) to enhance the efficiency of the light coupling. The shaped layer 28 may be added to the structure without the need for an additional mask in the process flow.

Figure 6:
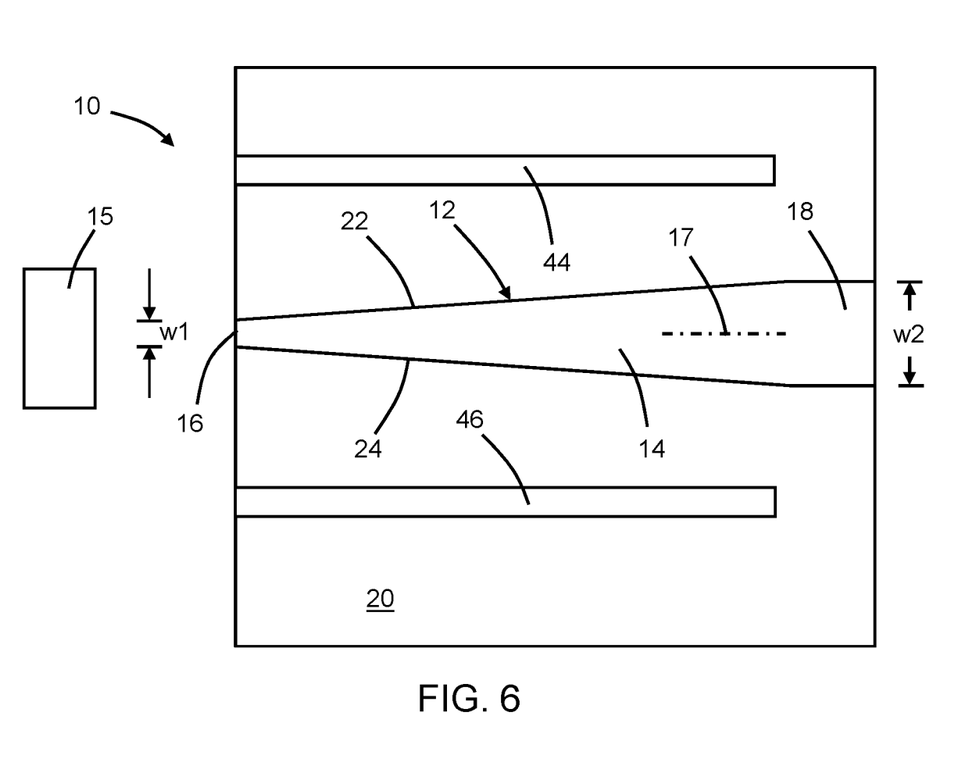
FIGS. 6-8 are top views of structures in accordance with alternative embodiments of the invention.

With reference to FIG. 6 in which like reference numerals refer to like features in FIG. 1 and in accordance with alternative embodiments of the invention, strips 44, 46 may be formed adjacent to the waveguide core 12. In the representative embodiment, the inverse taper 14 is laterally arranged between the strips 44, 46 with the strip 44 positioned adjacent to the side surface 22 and the strip 46 positioned adjacent to the side surface 24. The strips 44, 46 may be comprised of the same material as the waveguide core 12, and the strips 44, 46 may be patterned when the waveguide core 12 is patterned. The strips 44, 46, as well as the inverse taper 14, may be located directly beneath the shaped layer 28 and laterally between the side surfaces 30, 32. In an embodiment, the strips 44, 46 and the inverse taper 14 may be fully located lengthwise directly beneath the shaped layer 28. In an embodiment, the strips 44, 46 and the inverse taper 14 may be fully located lengthwise and widthwise directly beneath the shaped layer 28. Processing continues as previously described in connection with FIGS. 3-5.

Figure 7:
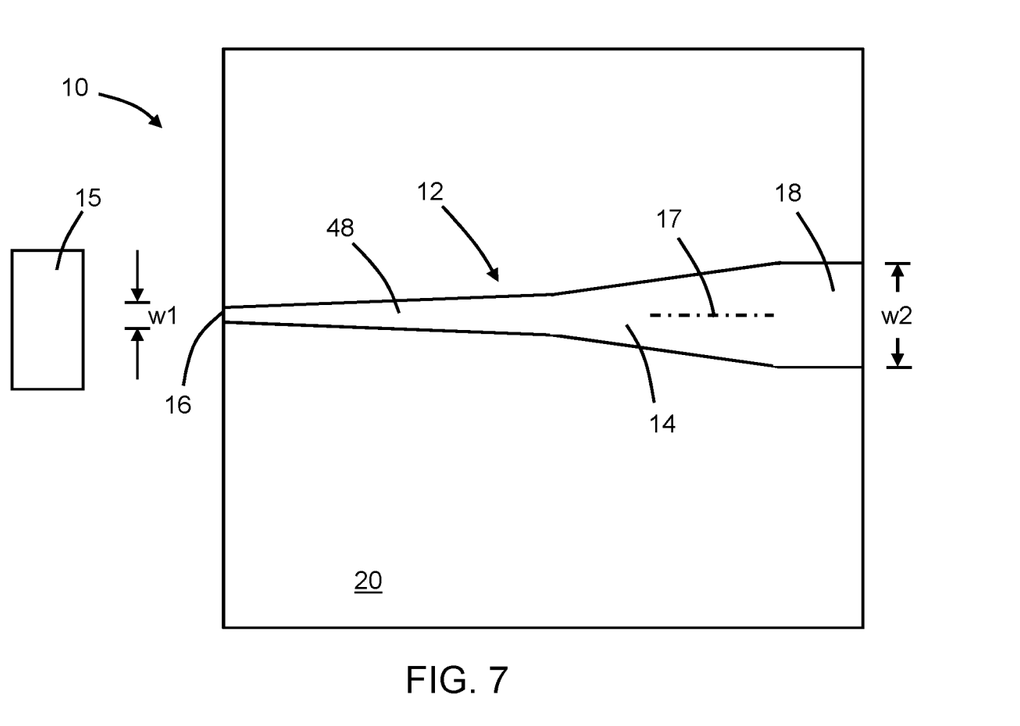

With reference to FIG. 7 in which like reference numerals refer to like features in FIG. 1 and in accordance with alternative embodiments of the invention, the waveguide core 12 may be modified to add another inverse taper 48 between the inverse taper 14 and the end surface 16. The patterning of the waveguide core 12 may be adjusted to provide a different shape that adds the inverse taper 48. Processing continues as previously described in connection with FIGS. 3-5. In an alternative embodiment, the strips 44, 46 (FIG. 6) may be added adjacent to the opposite side surfaces 22, 24 of the inverse tapers 14, 48.

Figure 8:
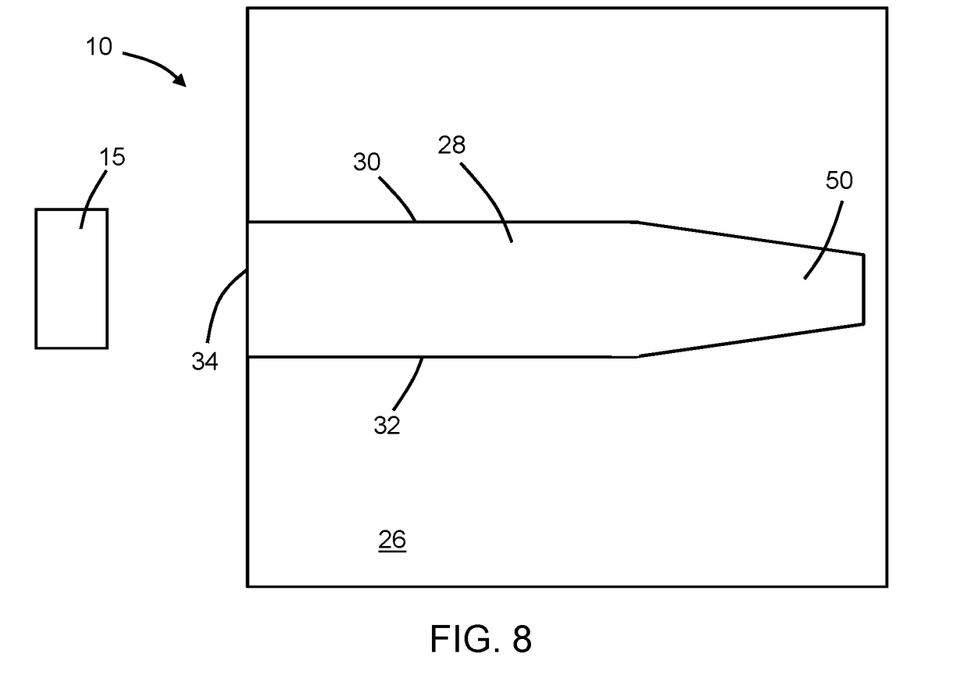

With reference to FIG. 8 in which like reference numerals refer to like features in FIG. 3 and in accordance with alternative embodiments of the invention, the shaped layer 28 may be modified to add a tapered section 50 as a non-rectangular shape that is appended to the rectangular shape. The tapered section 50 may be located over a portion of the inverse taper 14 and is tapered in the opposite sense from the inverse taper 14. In the latter regard, the tapered section 50 narrows with increasing distance from the end surface 16 of the waveguide core 12, whereas the inverse taper 14 widens with increasing distance from the end surface 16 of the waveguide core 12. In an embodiment, the tapered section 50 may located directly over the inverse taper 14 as shown in FIG. 7 with the rectangular shape located directly over the inverse taper 48 of the waveguide core 12.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a substrate;
   a first dielectric layer on the substrate;
   an edge coupler including a waveguide core positioned over the first dielectric layer, the waveguide core comprised of single-crystal silicon, the waveguide core including a first inverse taper and a second inverse taper directly connected to the first inverse taper, and the first inverse taper and the second inverse taper of the waveguide core tapering in a first direction along a longitudinal axis of the waveguide core;
   a shaped layer including a rectangular section positioned directly over the first inverse taper of the waveguide core and a tapered section positioned directly over the second inverse taper of the waveguide core, the shaped layer comprised of silicon nitride, and the tapered section of the shaped layer tapering in a second direction along the longitudinal axis opposite to the first direction;
   a second dielectric layer positioned between the waveguide core and the shaped layer; and
   a third dielectric layer over the shaped layer,
   wherein the shaped layer is located on the second dielectric layer, and the shaped layer is embedded in the third dielectric layer.

2. The structure of claim 1 wherein the waveguide core includes an end surface, and the first inverse taper extends to the end surface.

3. The structure of claim 2 wherein the rectangular section includes a first side surface and a second side surface opposite to the first side surface, the first inverse taper includes a first side surface and a second side surface opposite to the first side surface, and the first side surface and the second side surface of the first inverse taper are laterally positioned between the first side surface of the rectangular section and the second side surface of the rectangular section.

4. The structure of claim 1 further comprising:
   a laser,
   wherein the first inverse taper is terminated by an end surface, and the end surface of the first inverse taper is positioned adjacent to the laser.

5. A method comprising:
   providing a substrate and a first dielectric layer on the substrate;
   forming an edge coupler including a waveguide core positioned over the first dielectric layer, wherein the waveguide core includes a first inverse taper and a second inverse taper directly connected to the first inverse taper, and the first inverse taper and the second inverse taper of the waveguide core taper in a first direction along a longitudinal axis of the waveguide core;
   forming a shaped layer including a rectangular section positioned directly over the first inverse taper of the waveguide core and a tapered section positioned directly over the second inverse taper of the waveguide core, wherein the tapered section of the shaped layer tapers in a second direction along the longitudinal axis opposite to the first direction;

forming a second dielectric layer, wherein the second dielectric layer is positioned between the waveguide core and the shaped layer; and forming a third dielectric layer over the shaped layer, wherein the shaped layer is located on the second dielectric layer, the shaped layer is embedded in the third dielectric layer, the waveguide core is comprised of single-crystal silicon, and the shaped layer is comprised of silicon nitride.

6. The method of claim 5 wherein forming the shaped layer including the rectangular section positioned directly over the first inverse taper of the waveguide core and the tapered section positioned directly over the second inverse taper of the waveguide core comprises:

depositing a layer containing the silicon nitride; and patterning the layer to form the shaped layer with a plurality of surfaces defining the rectangular section and the tapered section.

7. The method of claim 5 wherein the first dielectric layer is an oxide layer, the substrate is comprised of single-crystal silicon, the second dielectric layer is silicon dioxide, and the third dielectric layer is silicon dioxide.

\* \* \* \* \*